United States Patent

Hunter

[11] 3,745,823
[45] July 17, 1973

[54] AIR SPEED INDICATOR

[76] Inventor: Cecil M. Hunter, P. O. Box 602, Sun City, Ariz. 85351

[22] Filed: Dec. 22, 1971

[21] Appl. No.: 117,406

[52] U.S. Cl. .................. 73/182, 73/212, 73/387, 73/393, 73/397, 73/410
[51] Int. Cl. .................. G01p 5/16, G01l 7/06
[58] Field of Search .................. 73/182, 386, 387, 73/393, 397, 406, 408, 409, 410, 431, 212

[56] References Cited
UNITED STATES PATENTS

| | | | |
|---|---|---|---|
| 2,185,971 | 1/1940 | Achtel et al. | 73/410 |
| 2,639,613 | 5/1953 | Richmond | 73/393 X |
| 2,502,776 | 4/1950 | Burdick | 73/410 |
| 1,471,174 | 10/1923 | Landey | 73/408 |
| 1,841,651 | 1/1932 | Sprague et al. | 73/408 |
| 2,894,392 | 7/1959 | McLaughlin | 73/393 |

Primary Examiner—Richard C. Queisser
Assistant Examiner—John P. Beauchamp
Attorney—Clarence A. O'Brien and Harvey B. Jacobson

[57] ABSTRACT

A pitot tube connected, bellows actuated and temperature corrected air speed indicator including a linear upstanding readout scale. The indicator includes adjustments whereby the calibration of the indicator may be readily altered in order to increase or decrease the increments spread throughout a given range of increments on the read-out scale of the indicator.

The air speed indicator has been specifically designed with a vertical read-out scale. Further the indicator includes an indicator actuating mechanism which is simple in design and therefore more durable and dependable. Also, each of the two forms of the indicators specifically illustrated and disclosed hereinafter include automatic temperature compensating means and the indicator, by being provided with a linear read-out scale, is designed to be utilized in close proximity to other aircraft instruments of the new types including vertical read-out scales.

4 Claims, 6 Drawing Figures

Cecil M. Hunter
INVENTOR.

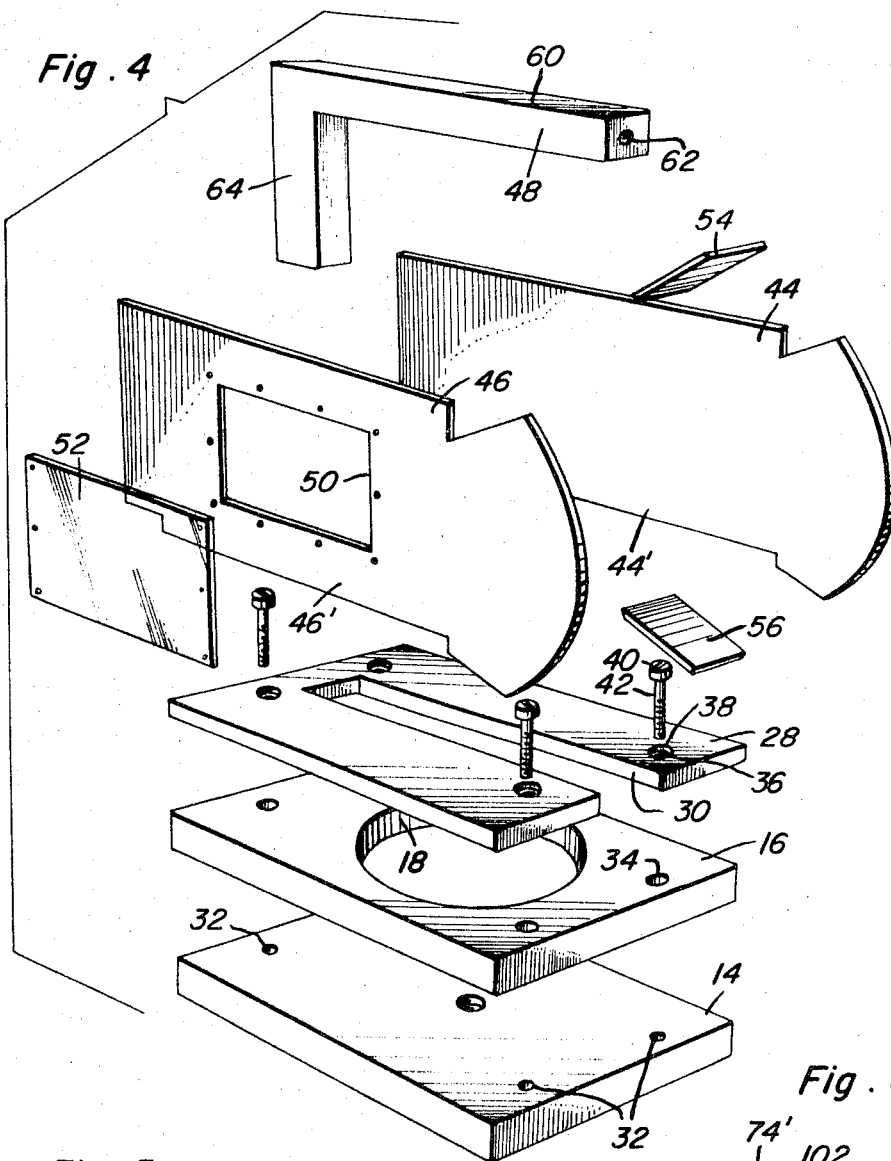
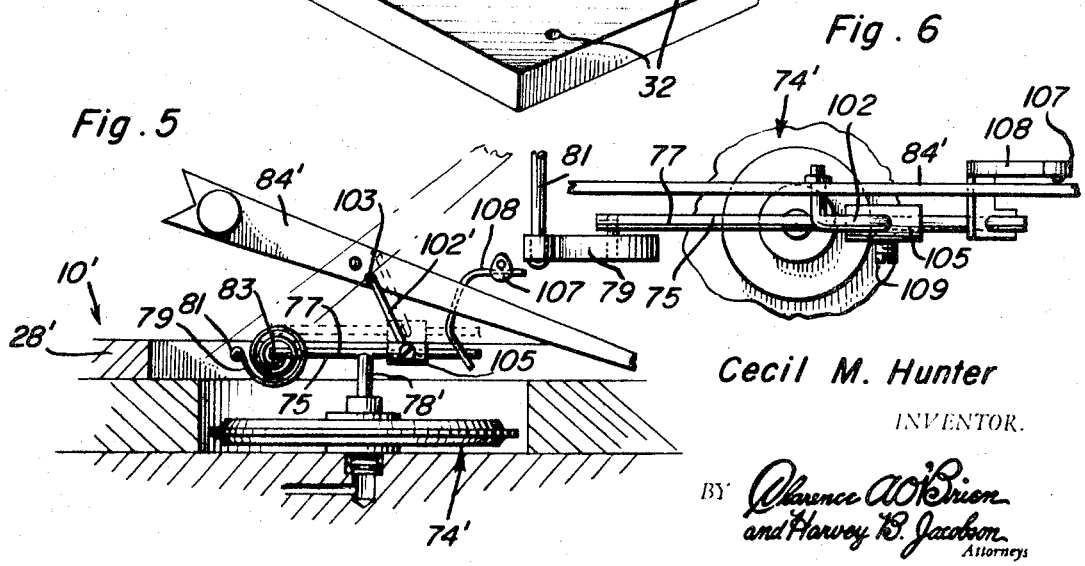

AIR SPEED INDICATOR

The main object of the invention is to provide an air speed indicator with a vertical read-out scale and a narrow upstanding housing for mounting in close proximity to other newer types of aircraft gauges of the vertical read-out type.

Another object of this invention is to provide an air speed indicator with automatic temperature compensating means.

Still another object of this invention is to provide an air speed indicator whose indicator needle actuating mechanism is simplified in the interest of increased reliability and durability.

Another important object of this invention is to provide an air speed indicator with adjustment means operative to vary the increment spacing of a particular range of increments of the read-out portion of the indicator.

A final object of this invention to be specifically enumerated herein is to provide an air speed indicator which will conform to conventional forms of manufacture, be of simple construction and easy to read so as to provide a device that will be economically feasible, long lasting and easy to use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 4 is an exploded perspective view of the housing of the air speed indicator illustrated in FIGS. 1 through 3;

FIG. 5 is a fragmentary sectional view similar to FIG. 3 but illustrating a modified form of indicator arm actuating mechanism; and FIG. 6 is a fragmentary plan view of the assemblage illustrated in FIG. 5.

Figure 1:
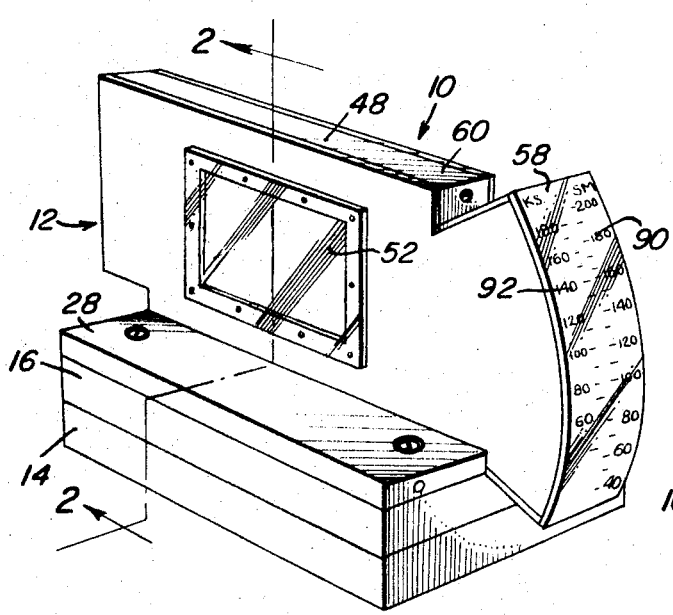
FIG. 1 is a perspective view of a first form of air speed indicator constructed in accordance with the present invention.
Figure 2:
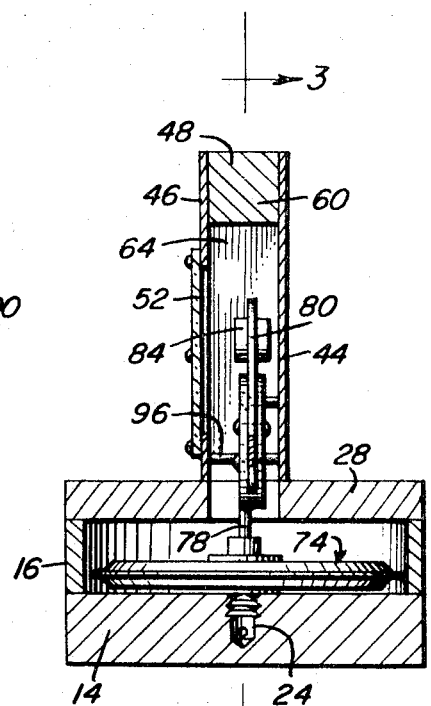
FIG. 2 is an enlarged fragmentary transverse vertical sectional view taken substantially upon a plane indicated by the section line 2—2 of FIG. 1.

Referring now more specifically to the drawings the numeral 10 generally designates a first form of air speed indicator. The indicator 10 includes a housing which is referred to in general by the reference numeral 12 and including a generally rectangular base plate 14 on whose upper surface a spacer plate 16 is disposed. The spacer plate 16 includes a central opening 18 and the base plate 14 includes a horizontal bore 20 formed therein opening through the rear edge portion of the base plate 14 and including a threaded counterbore 22 at its rear open end. The forward end of the bore 20 opens into the lower end of an upstanding blind bore 24 formed in the base plate and the upper end of the blind bore 24 includes a threaded counterbore 26. Counterbore 26 opens upwardly centrally into the opening 18 and a thin mounting plate 28 having an upstanding slot 30 formed therein is disposed over the upper surface of the spacer plate 16. The slot 30 opens forwardly to the forward marginal edge portion of the mounting plate 28 and is generally centrally disposed intermediate the opposite side edge portions of the mounting plate 28 with the rear end of the slot 30 terminating at a point spaced slightly forwardly of the rear marginal edge portion of the mounting plate 28.

The base plate 14 has four threaded bores 32 formed therein and the spacer plate 16 has corresponding but slightly larger bores 34 formed therein. In addition, the mounting plate 28 has similar bores 36 formed therein and the upper bores 36 include diametrically enlarged counterbores 38 in which the enlarged heads 40 of a plurality of fasteners 42 secured through the mounting plate 28 and the spacer plate 16 are seated when the lower ends of the threaded fastener 42 are threadedly engage in the bores 32.

A pair of side walls 44 and 46 are provided and secured to the opposite sides of an L-shaped divider 48 in fluid-tight sealed engagement therewith and the side walls or plates 44 and 46 include lower marginal edge portions 44' and 46' which are received downwardly within the slot 30. The side wall 46 has an access opening 50 formed therein and a cover 52 is provided for and secured over the access opening 50. A pair of oppositely inclined closure plates 54 and 56 and a transparent instrument face 58 are secured between the forward end portions of the side walls 44 and 46 that project forwardly of the divider and the mounting plate 28. The various components of the housing 12 are secured together in fluid-tight sealed engagement with each other and the forward end of the upper horizontal leg 60 of the divider 48 includes a threaded blind bore 62 in which a mounting fastener may be secured. Further, the rear upstanding leg 64 of the divider 48 is provided with a restricted static pressure opening 66.

The discharge end of a pitot tube 68 is communicated with the inlet end of the bore 20 by means of a fitting 70 carried by the tube 68 and threadedly engaged in the counterbore 22 and a bellows assembly referred to in general by the reference numeral 74 and including a tubular threaded mounting neck 76 is disposed within the opening 18 with its neck 76 threadedly engaged in the threaded counterbore 26. The upper side of the bellows assembly 74 includes an upwardly projecting shank 78 and an indicating needle or arm 80 is oscillatably supported from the side wall 44 by means of a pivot fastener 82. The rear end of the arm 80 includes a counterweight 84 and the forward end of the arm 80 has a bimetallic extension 86 secured thereto. The free end of the extension 86 includes an indicator head 88 registrable with the two sets of indicia 90 and 92 formed on the instrument face 58. The indicia 90 indicates statute miles per hour and the indicia 92 indicates air speed in knots.

Figure 3:
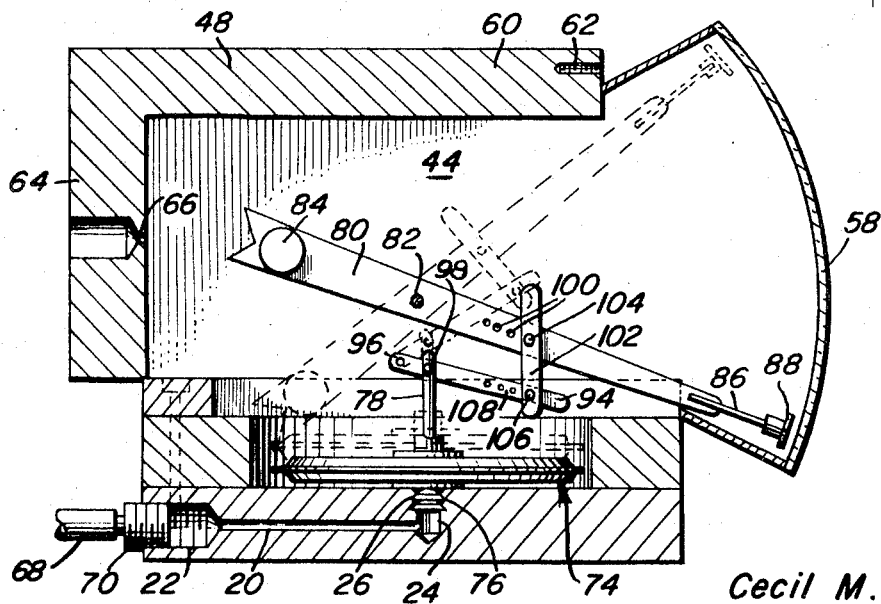
FIG. 3 is a vertical sectional view taken substantially upon a plane indicated by the section line 3—3 of FIG. 2 and with an alternate position of the indicator hand or arm illustrated in phantom lines.

An actuating lever 94 is pivotally supportd between the lower portions of the side walls 44 and 46 at one end from a pivot fastener 96 extending between the side walls 44 and 46 and the upper end of the shank 78 is pivotally connected to the lever 94 as at 98. In addition, the indicator arm 80 has a plurality of longitudinally spaced apertures 100 formed therein and one end of a connecting link 102 is pivotally secured to the indicator arm 80 by means of a fastener 104 secured through the link 102 and one of the apertures 100. Further, the lower or opposite end of link 102 is pivotally secured to the free end of the lever 94 by means of a fastener 106 secured through the lower end of the link 102 and one of the longitudinally spaced apertures 108 formed in the free end of the lever 94. Accordingly, air pressure received in the bore 20 will cause the bellows assembly 74 to expand thus raising the shank 78 and swinging the forward end of the lever 94 upwardly whereby the forward end of the indicator arm 80 is swung upwardly from the solid line position thereof illustrated in FIG. 3 of the drawings toward the phantom line position illustrated in FIG. 3. The extension 86 is in the form of a flat strap extending between the free end of the indicator arm 80 and the indicator head 88 and inasmuch as the strap or extension 86 comprises a bimetallic strip, automatic compensation for temperature changes is realized. Of course, according to the range of the indicia 90 and the indicia 92 the pivot points 104 and 106 may be varied along the indicator arm 80 and the lever 94.

With attention now invited more specifically to FIGS. 5 and 6 of the drawings, there will be seen a modified form of indicator referred to in general by the reference numeral 10' and including a bellows assembly 74' corresponding to the bellows assembly 74. However, the bellows assembly 74' includes a T-shaped bar 75 including an upper horizontal bimetallic section 77 and an upstanding shank 78' corresponding to the section 78. A coiled tension spring 79 is anchored as at 81 to the mounting plate 28' corresponding to the mounting plate 28 and at the other end to one end of the section 78' of the head 75 as at 83, the spring 79 merely serving to eliminate play between the head 75 and upper portion of the bellows assembly 74'.

The indicator 10 includes an indicator arm 80' corresponding to the indicator arm 80 and a connecting link 102' corresponding to the link 102 is pivotally secured to the arm 84' as at 103 at one end and includes a sleeve 105 at its other end adjustably secured in position along the end of the section 77 remote from the spring 79. Also, an anchor block 107 is anchored to the side wall of the housing portion of the indicator 10 corresponding to the side wall 44 and supports one end of a leaf spring 108 therefrom. The other end of the leaf spring 108 is engaged with and bears down upon the terminal end portion of the section 77 remote from the spring 79.

Inasmuch as the section 77, or at least the end portion thereof on which the sleeve 105 is mounted comprises a bimetallic member, the T-head 75 also serves to compensate for changes in temperature. Further, spring 108 comprises a restricting spring and functions to retard upward movement of the T-head 75.

The sleeve 105 is freely slidable along the section 77 of the T-head 75 and includes a setscrew 109 for retaining the sleeve 105 in adjusted position. Also, the lower end of the blind bore 24 may be extended downwardly through the base plate 14 and plugged with the removable plug. When such a removable plug is provided, the bellows assembly 74 may be provided with a threaded type adjustment screw facing downwardly in the bore 24 and engageable by a tool inserted upwardly through the lower end of the bore 24 after the plug is removed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An air speed indicator comprising a closed and sealed housing provided with a restricted static pressure inlet and having a bellows assembly disposed therein with one side of the assembly anchored relative to the housing and communicated with the downstream end of a pitot tube, said housing including an elongated transparent window wall portion having air speed indicating indicia spaced therealong, an indicating hand oscillatably supported within said housing for swinging of one end of the hand along said widow wall portion in close proximity thereto, and motion transmitting means operatively connecting the other side of said bellows assembly to said hand for oscillation of the latter in response to expansion and contraction of said bellows assembly, said motion transmitting means including a shank supported from and projecting endwise outwardly from the other side of said bellows assembly and longitudinally shiftable with said other side generally in the plane of swinging movement of said hand, a lever pivotally supported from said housing for oscillation generally in the same plane in which said hand is swingable and generally paralleling the latter, the outer end of said shank being pivotally attached to said lever a spaced distance from the axis of oscillation thereof, a connecting link, means pivotally connecting the opposite ends of said connecting link to said lever and hand at points spaced therealong from the pivot axes thereof, the last-mentioned means including means operable to selectively independently shift the axes of oscillation of pivotal connection of said link ends to said hand and lever longitudinally along said hand and lever.

2. The combination of claim 1 wherein said upper portion of said housing is relatively narrow and said window wall portion is longitudinally bowed with its center of curvature generally coinciding with the axis of oscillation of the indicating hand, said window wall portion being concavo-convex with its concave side opening toward said the axis of oscillation of said hand.

3. The combination of claim 1 wherein said one end portion of said hand includes a bimetallic extension, the free end of said extension having a transverse indicating head thereon extending transversely of said elongated widow wall portion.

4. The combination of claim 1 wherein said one end portion of said hand includes a bimetallic extension, the free end of said extension having a transverse indicating head thereon extending transversely of said elongated window wall portion, said transparent window wall portion is vertically disposed and supported from the forward side of an upper portion of said housing, said upper portion of said housing is relatively narrow and said window wall portion is longitudinally bowed with its center of curvature generally coinciding with the axis of oscillation of the indicating hand, said window wall portion being concavo-convex with its concave side opening toward said axis of oscillation.

* * * * *